April 29, 1947.    G. MUFFLY    2,419,787
AIRCRAFT ENGINE AND PROPELLER UNIT
Filed April 9, 1941    5 Sheets-Sheet 1
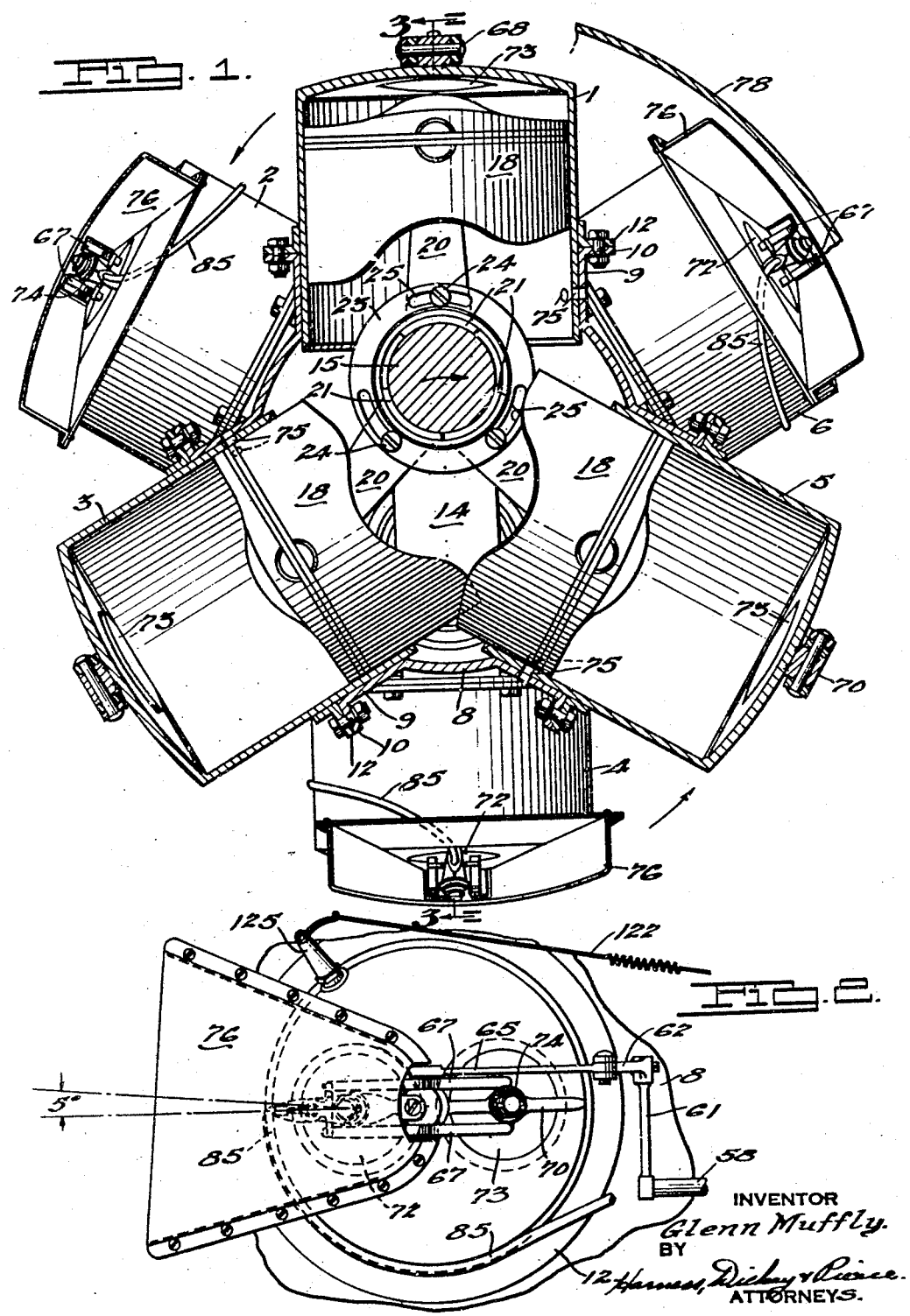
INVENTOR
Glenn Muffly
BY
Harness, Dickey & Pierce
ATTORNEYS

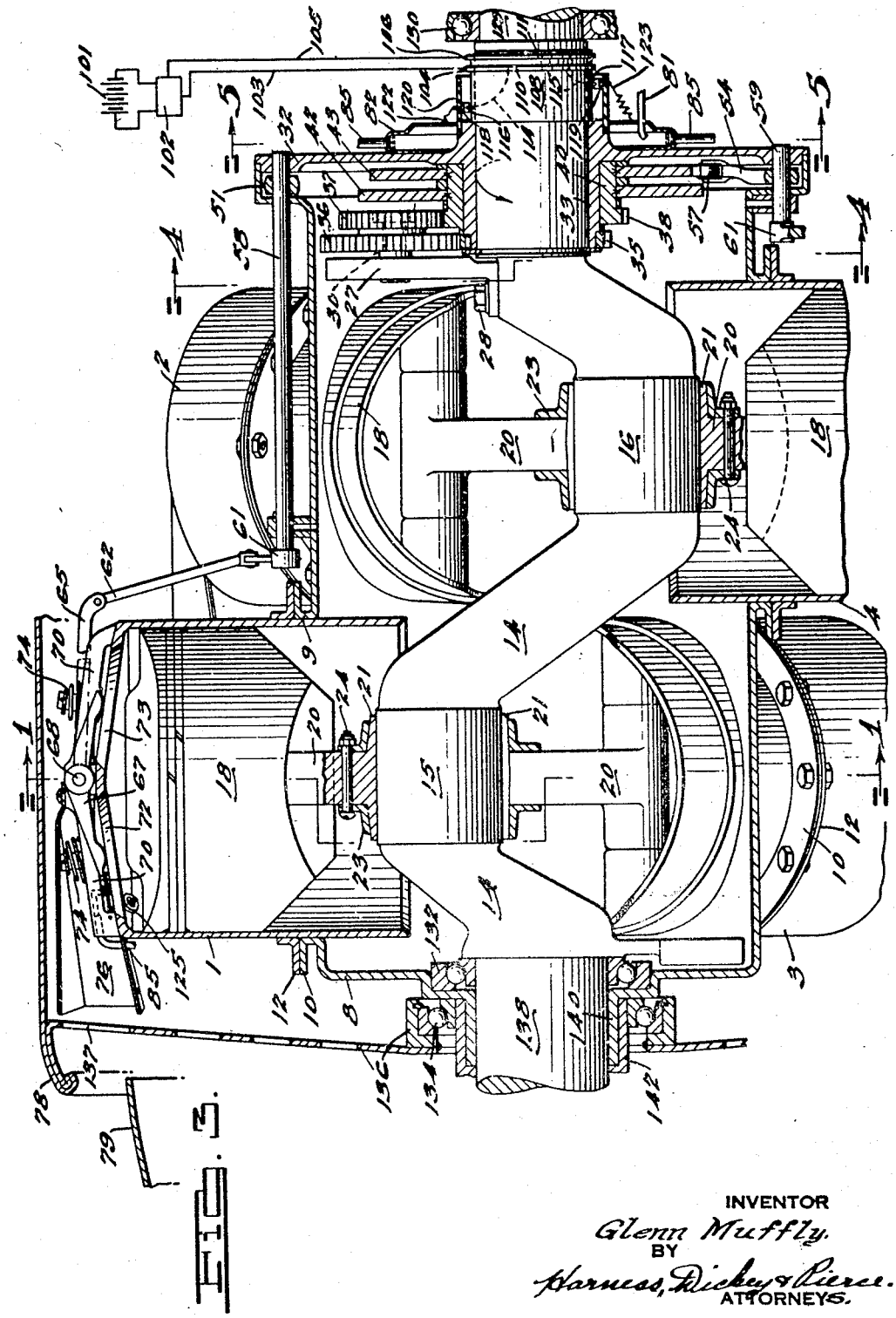

April 29, 1947.　　　G. MUFFLY　　　2,419,787
AIRCRAFT ENGINE AND PROPELLER UNIT
Filed April 9, 1941　　　5 Sheets-Sheet 3
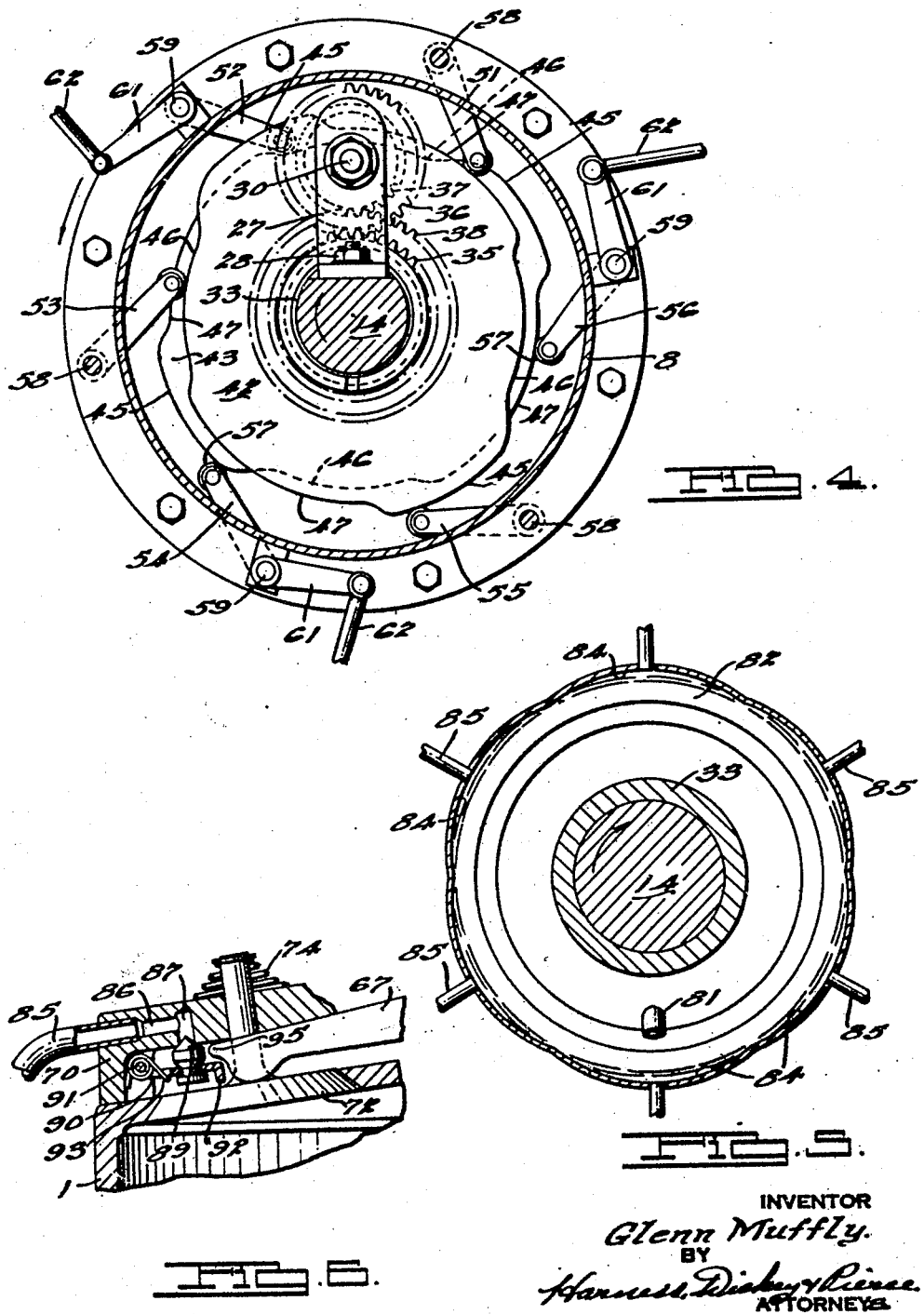
INVENTOR
Glenn Muffly.
BY
ATTORNEYS

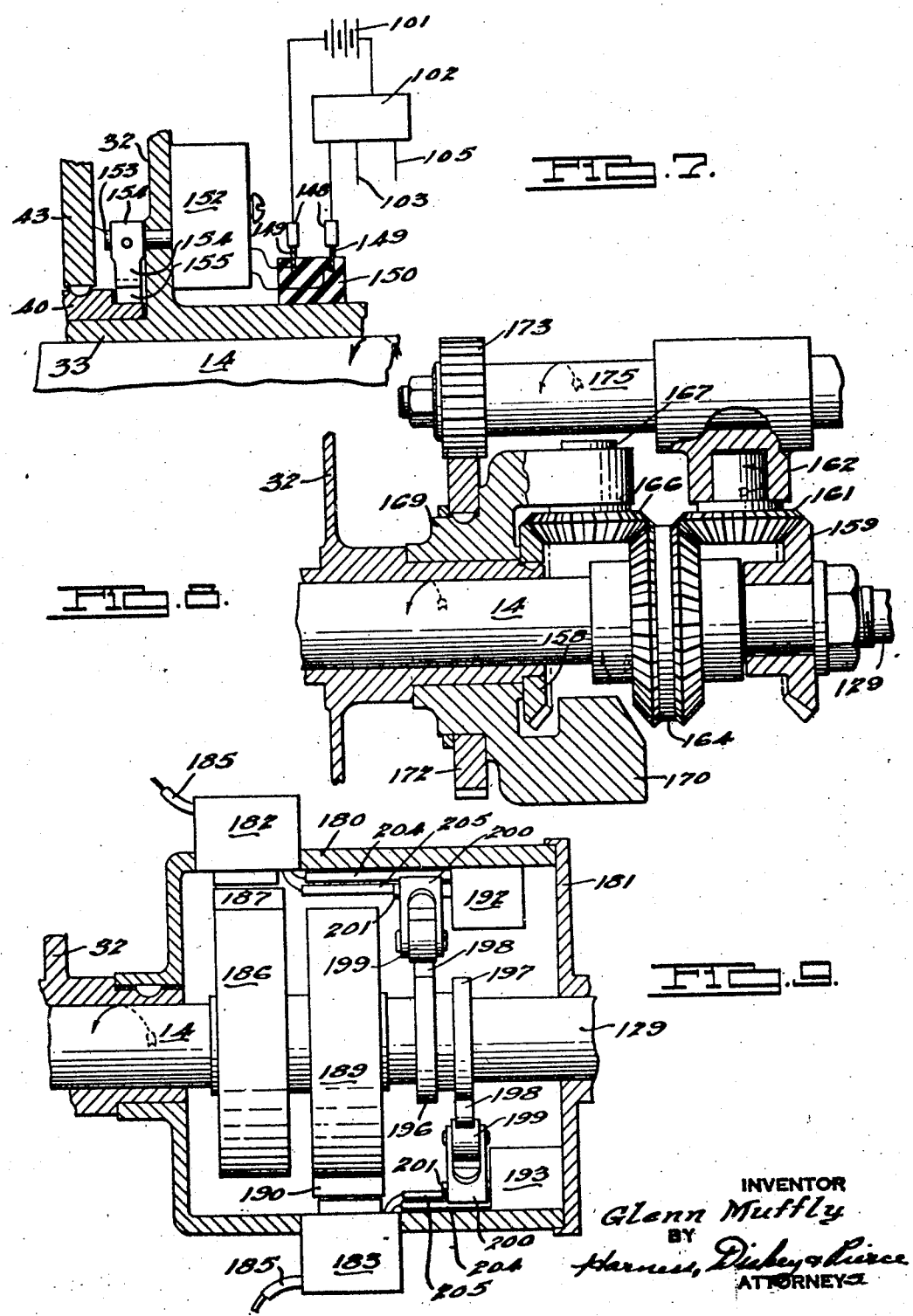

April 29, 1947.  G. MUFFLY  2,419,787
AIRCRAFT ENGINE AND PROPELLER UNIT
Filed April 9, 1941  5 Sheets-Sheet 5
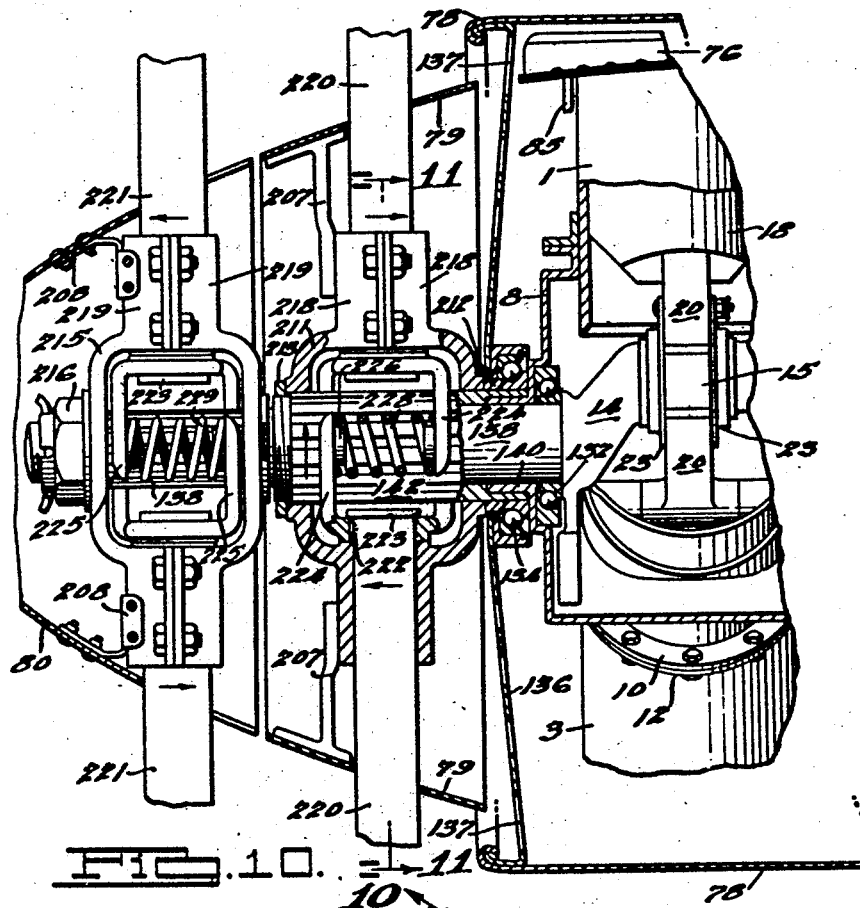
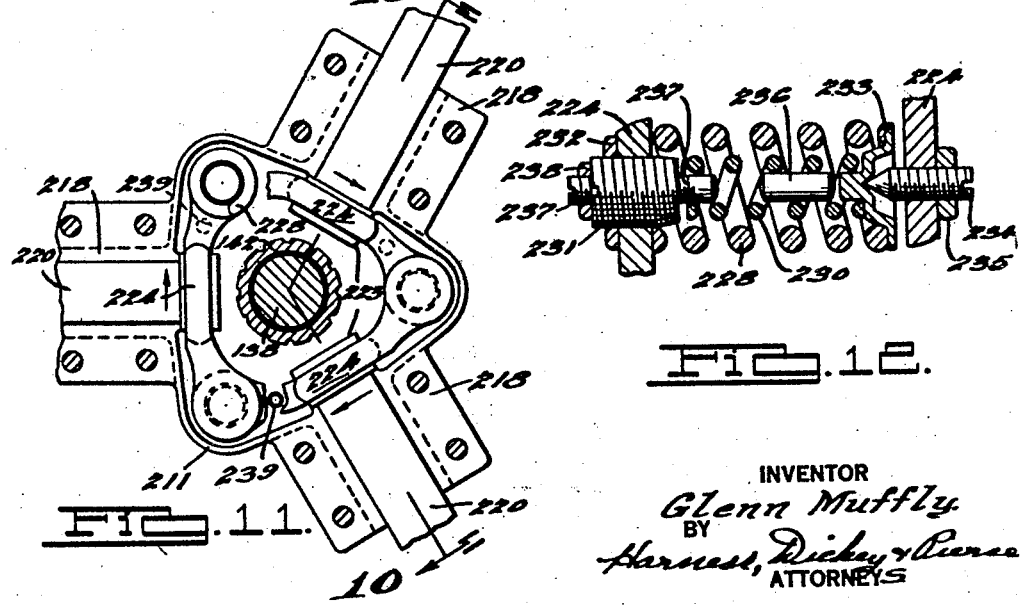
INVENTOR
Glenn Muffly
BY
Harness, Dickey & Pierce
ATTORNEYS Patented Apr. 29, 1947

2,419,787

UNITED STATES PATENT OFFICE 2,419,787

AIRCRAFT ENGINE AND PROPELLER UNIT

Glenn Muffly, Springfield, Ohio

Application April 9, 1941, Serial No. 387,709

5 Claims. (Cl. 170—135.6)

This invention relates to internal combustion engines and particularly to engines of the bi-rotary type, i. e., the type in which cylinders and crank shaft revolve in opposite directions.

In particular this invention has to do with the bi-rotary type of engine as applied to aircraft, driving a pair of co-axial propellers in opposite directions.

It has been found that a pair of propellers mounted upon the same axis, quite close together, and driven in opposite directions is a very efficient combination, but ordinarily this propeller arrangement is only made possible by the use of gearing. Such gearing is eliminated by mounting the two propellers directly on the crank shaft and crank case respectively of an engine of the bi-rotary type. This is disclosed in my Patent No. 1,064,522, over which the present invention is an improvement.

An object of this invention is to put an engine of a given piston displacement into a smaller frontal area than is practicable with other types of engines now in use.

Another object is to provide a new type of connecting rod construction, adapted for this small diameter type of engine and the short connecting rods used therein.

A further object is to provide air intake for the cylinders, arranged to obtain a supercharging effect from the air speed of the plane without the use of a supercharger.

A further object is to provide for the use of variable pitch propellers of a new type which acts automatically to increase the pitch in a rarefied atmosphere and is adapted for use on the bi-rotary type of engine without the need for pitch control connections. While co-axial propellers of the variable pitch variety have been disclosed with remote controls for varying their pitches, such propellers are not suited for use on the bi-rotary type of engine because of the complications incident to making the control connections.

Still another object of this invention is to provide liquid fuel distribution means of a type which will insure the uniform division of fuel between the several cylinders.

Another object is to provide for injection of liquid fuel into the intake air stream instead of into the cylinder itself, thus simplifying the problem of making and timing the liquid injection valves.

A still further object is to make a variable pitch propeller in which the blades are balanced as to their torque reactions, thus insuring against one blade of a propeller carrying a greater load than another and against the out-of-balance condition resulting therefrom.

Still another object is to provide for the use of a one-piece crank shaft in a radial engine having its cylinders arranged in two or more banks and at the same time to provide for the use of solid rings for securing the connecting rods to the crank pins.

Referring to the drawings, in which similar reference numbers refer to similar parts throughout the several views:

Figure 1 is an end view of the engine from its propeller end, showing a section through the nearer bank of three cylinders.

Figure 2 is a top view of one of the cylinders, showing the valve mechanism and intake scoop.

Figure 3 is a longitudinal section of Figure 1, taken on the line 3—3 thereof.

Figure 4 is a view of the cams taken on the line 4—4 of Figure 3.

Figure 5 is a sectional view of the liquid fuel distributing ring taken on the line 5—5 of Figure 3.

Figure 6 is an enlarged detail view of the inlet valve and liquid fuel valve.

Figure 7 is a modified detail of Figure 3, showing one type of ignition system applicable to this type of engine.

Figure 8 shows another modification of the end of the engine opposite from the propellers, including an arrangement of gearing suitable for driving a magneto or other accessory at a speed bearing a fixed relationship to the sum of the two speeds of rotation, i. e., to the piston speed.

Figure 9 illustrates somewhat diagrammatically one method for equipping this type of engine with a magneto of which one element revolves with the cylinders and the other element revolves with the crank shaft.

Figure 10 is a plan view partly in section showing the propellers, their relationship to the engine and the means for controlling the pitch of the propellers automatically. This view is an extension of Figure 3 and further illustrates the supercharging method.

Figure 11 is a section of Figure 10 on the line 11—11 thereof, showing the relationships of the three propeller blades and their actuating springs.

Figure 12 is an enlarged detail of Figure 10, showing means for spring adjustments and stops.

Referring to Figure 1, in which we see the engine from the propeller end, sometimes spoken of as the front, it will be seen that cylinder number 1 is at top dead center and that the cylinders are revolving counter-clockwise. While the crank shaft is at the same time moving clockwise in this view, it is only necessary to consider relative rotation in studying the operation, so we may, for convenience, consider the crank shaft as standing still while the cylinders revolve, or we may consider the cylinders as standing still while the crank shaft revolves in the opposite direction.

In Figure 1 the cylinders are numbered from 1 to 6 inclusive in their order of firing. It will be noted that cylinders 1, 3 and 5 have their pistons connected with the forward crank pin, whereas the other three cylinders have their pistons connected with the other crank pin, which is set at 180° from the crank pin seen in section in this figure.

The crank case 8, also seen in Figure 3, is preferably formed of drawn steel. It is formed first into a tubular or cup shape and then the cylinder-supporting collars are pressed outwardly to form the cylinder supports 9 and the flanges 10 to which the cylinders are bolted by means of their flanges 12 which are welded to the individual cylinders.

The crank shaft 14, best seen in Figure 3, has two crank pins, 15 for the forward bank of cylinders and 16 for a rear bank of cylinders. It will be noted that the diameter of these crank pins is larger than the intervening and rearward portions of the crank shaft. The reason for this will be apparent in connection with the connecting rod assembly. It should also be noted that the design of the crank shaft eliminates the usual breaking point at each end of each crank pin, next to the cheek.

The pistons 18 are shown with two rings in one groove, these rings serving also to retain the piston pin. The piston heads are so formed as to allow for the piston pin being located as near as possible to the upper extremity of the piston and the skirts of the piston are cut away to provide clearance between each other and clearance between the piston skirts and the crank shaft. The proportions shown are intended for putting the maximum piston displacement into a minimum diameter of frontal area. In these drawings the connecting rods are shown as being unusually short, the pistons are unusually short and the stroke is shown as being only two-thirds of the bore.

This crowding together of the cylinders and the extreme inward travel of the pistons, almost withdrawing them from the cylinders, would not be practicable in a fixed cylinder type of engine, but is made possible by the action of centrifugal force upon the pistons in this type of engine. The design as shown is slightly extreme in this direction of crowding together, both because it is desired to illustrate this point and because this application is being prepared in conjunction with one covering a special type of plane in which it is intended to reduce frontal area, even at the expense of engine efficiency and life. For more conventional aircraft the design would preferably employ a longer stroke and swing in a somewhat larger circle.

It should be noted that while the drawings show only a six cylinder engine, it is possible to build them in various lengths and numbers of cylinders. Using a four-throw crank shaft with three cylinders in each of the four banks we will have a twelve cylinder engine without any increase in frontal area. This can be carried further with a six-throw crank shaft, putting eighteen cylinders in this same frontal area or an eight-throw crank shaft which gives us twenty-four cylinders in the same diameter of circle.

One feature which contributes to the compact design is the new type of connecting rod 20, each of which has a foot 21 bearing directly upon the crank pin and is retained by a pair of connecting rod rings 23 which hold the connecting rod against the associated crank pin. The rings 23 are assembled by slipping them on over the end of the crank shaft opposite the propellers. After the connecting rods are placed in position the two rings surrounding that crank pin are brought together and secured by means of the bolts 24. These bolts and their nuts do not draw down tightly upon the rings 23, but are firmly fixed in the connecting rods and are free to move in the arcuate slots 25. The connecting rod feet 21 are preferably formed of or coated with bearing metal, while the crank shaft and the rings 23 are made of steel. Each connecting rod, therefore, has a bearing between its foot 21 and the crank pin and it also has bearings between the foot 21 and the rings 23.

This connecting rod construction occupies less room than the usual master rod with auxiliary short rods pivoted thereto. It also occupies less space than the Le Rhone type of connecting rod bearing. It has the further advantage of not requiring a built-up crank shaft and it makes possible the employment of solid rings instead of split rings illustrated in my U. S. Patent No. 1,377,723.

In Figure 3 we see the timing gears. Two of them are supported by the arm 27 which is in turn secured to the crank shaft by bolts 28 and carries the stud 30 on which revolves the cluster comprising gears 36 and 37. The crank case 8 is closed at its rear end by the part 32 which includes the hub 33 carrying the gear 35 which is keyed thereto. The gear 35 revolves with the crank case and drives the gear 36 which is one piece with or keyed to the gear 37, both rotating as one on the stud 30. The gear 37 drives the gear 38 which is one piece with or rigidly attached to the hub 40, to which the front cam 42 and the rear cam 43 are attached so that they rotate at the same speed as the gear 38.

It will be noted that the cam drive is between the two revolving elements, having no part attached to any fixed support. The rate of rotation of the cams relative to the cylinders is one to four. In other words, if the crank shaft were to stand still and the cylinders rotate the cams would be rotated by these gears in the same direction that the cylinders are moving and at three fourths of the cylinder speed so that the cams will in effect be dropping back one revolution for each four revolutions of the cylinders.

Referring to Figure 4 it will be seen that each of the cams 42 and 43 has two segments of maximum radius identified by the numeral 45. These are the exhaust portions of the cams. Each cam has two inlet portions 46 of minimum radius and each cam has two portions 47 of intermediate radius which represent compression and explosion.

Inside of the crank case are six rocker arms number 51 for cylinder number 1, 52 for cylinder number 2, etc., up to 56 for cylinder number 6. Each of these rockers has a roller 57 bearing against the periphery of one of the cams. Each rocker, 51 to 56 inclusive, is mounted on a shaft. The rockers having even numbers are associated with the short rocker shafts 59 while the rockers having odd numbers are mounted upon the long rocker shafts 58 of which one is seen on the outside of the crank case in Figure 3.

Also seen in Figure 3 are two of the six outside cranks 61 of which one is mounted on each of the shafts 58 or 59 and connected to actuate one of the six pull rods 62. These pull rods actuate the valve rocker levers 65, each of which is arranged to actuate one of the pairs of double rockers 67 through the medium of the rocker shaft 68 which passes through the valve support 70. Exhaust valves 73 are opened when their rods 62 are pulled inwardly by high spots on the cam associated therewith. From this exhaust hump 45 the rollers 57 pass to an intake portion 46 of the cam.

The rollers 57 follow the cam contours due to the fact that centrifugal force is acting upon the pull rods 62 and the levers 61 and 65. The centrifugal force thus exerted is sufficient to open the intake valve 72. As the roller 57 reaches the hump which lifts it to the arc 47 of intermediate radius the intake valve is closed, this position being held throughout the arc 47, during compression and explosion. At the end of the explosion stroke the roller 57 is lifted up to the greater radius 45, opening the exhaust valve of that cylinder.

The form of the cam and the ratio of its drive will vary according to the number of cylinders and according to the choice as to whether the cam is to revolve forward or backward with respect to the cylinder rotation. The cam speed to be considered is the movement of the cam with respect to the cylinder assembly, but the drive for the cam is derived from the sum of the cylinder rotation and the crank shaft rotation. This drive provides for moving the cam relative to the cylinders through an angle represented by one cycle of cam contour while the cylinders make two revolutions relative to the crank shaft.

The formula for determining the number of cycles in the cam profile is as follows:

$\frac{N\pm 1}{2}$ = Number of cycles on cam, where N = number of cylinders in one plane, i. e., having their pistons connected with one crank pin.

When the "+" sign is used the cam will move slower than the cylinder assembly. When the "−" sign is used the cam will run ahead of the cylinder assembly. In any case the speed of cam movement relative to the cylinders will be one cycle of cam profile for four strokes of a piston. When the cam has an odd number of cycles it is possible to use one cam to operate both banks of cylinders in a staggered 6, 10, 14 or 18 cylinder engine.

In the design shown it would be possible to use a cam having a single cycle on its periphery and running faster than the cylinders at a speed relative to the cylinders equal to one-half the resultant speed between the cylinders and the crank shaft. While this would allow us to use one cam for six cylinders, the necessary gears do not fit so nicely into the design shown and the double cam arrangement is therefore shown in the drawings, each cam contour representing two cycles.

The cams with two cycles on their contours are geared to revolve slower than the cylinders. They are driven slower than the cylinders by a ratio of one-half revolution (one cycle) for each two revolutions that the cylinders make relative to the crank shaft. The gear ratio is therefore three to four, or three revolutions of the cam in the direction of the cylinder rotation for each four revolutions that the cylinders make relative to the crank shaft.

The gears for this may have the following numbers of teeth:

36 teeth on gear 35, attached to cylinders.
32 teeth on gear 36, the driven idler.
28 teeth on gear 37, the driving idler.
42 teeth on gear 38, attached to cams.

This ratio works out:

$$\frac{36}{32} \times \frac{28}{42} = \frac{3}{4}$$

It will be noted that there are 68 teeth in the first pair of gears and 70 teeth in the second pair of gears. They are made to operate on the same center distance by generating the gears with a standard cutter such as a hob and modifying the tooth depths and outside diameters with resulting changes in pressure angle and center distance of one or both of the pairs of gears.

The valve gearing could be designed to rotate the cam or cams at the required relative speed with parts equivalent to the gears 36 and 37 and their shaft or stud 30 mounted upon the crank case instead of upon the crank shaft (using the required gear ratio for any given cylinder arrangement), but this would require a weight to counterbalance these parts instead of using their weight as a part of the counterbalance weight on the crank shaft. The construction shown saves a part of the counterbalance weight.

In fixed cylinder radial engines and in revolving cylinder engines of which the crank shaft is fixed the general practice is to operate the cams by driving through gears having their bearings in fixed members, but where both the crank shaft and the cylinder elements are allowed to revolve the valve gear must be self-contained between the two revolving elements, unless these revolving elements are to be geared together in a manner which fixes their relative speeds of rotation.

While I have shown in Figure 8 a train of gearing which connects the revolving cylinder element with the crankshaft for the purpose of driving the accessory shaft 175 at a fixed ratio to the total revolution speed of the engine, it should be noted that this train of gearing does not regulate the relationship between cylinder R. P. M. and crankshaft R. P. M. This is a desirable feature since we wish to transmit all of the power directly to the propellers without carrying any of it through gearing.

If the two revolving elements were geared together in a manner to establish their ratio of rotation it would be necessary to proportion the two propellers with great care in order to avoid the transmission of power through the gearing which fixes the relative speed of rotation. In my design it will be seen that the torque exerted in driving the revolving cylinder element and its propeller is always exactly equal to the torque exerted in driving the crankshaft and its propeller. This provides for an exact balance of resultant torque, there being no means by which torque reaction can be transmitted to the plane.

It will be seen that the valves 72 and 73 are equipped with light springs 74, which are conical in form to allow for maximum opening of the valves. These springs are very light and could be dispensed with while the engine is running, since centrifugal force will insure closing of the valves. The springs are useful in starting the engine and in checking the valve timing. Each cylinder is drilled with auxiliary exhaust ports 15 near the bottom of the stroke. These ports relieve the exhaust valve of the greater part of its pressure just prior to its opening.

Each intake valve is housed by an intake scoop 76 which has its opening in a forward direction and is inclined in the direction of cylinder rotation. This direction of scoop opening is determined from the air speed of the plane and the speed of cylinder rotation so as to obtain the desired ramming effect of air at the intake port.

Between the engine housing or fuselage 78 and the spinner 79 attached to the rear one of the two propellers, there is a gap for the entrance of air. This gap is preferably located at a high pressure area on the nose of the fuselage or engine nacelle so that a considerable pressure of air is obtained for supercharging the cylinders and for cooling them. A second spinner 80 revolves with the forward propeller as seen in Figure 10. The air opening may be in the spinner 80, in the spinner 79, between them or between 79 and 78 as shown in Figure 10. This will depend upon the form of these parts, the location of high pressure area thereon and the degree of supercharging desired.

When air intake valve 72 is opened the air passes directly from the scoop 76 into the cylinder and at the same time a small quantity of liquid fuel is injected into the air stream.

Instead of depending upon the accuracy of pumps to divide the liquid fuel equally between the various cylinders I have provided a new type of gasoline distributor seen in Figures 3 and 5. Gasoline is pumped or otherwise forced to the nozzle 81 which delivers the liquid fuel to the inside of the annular trough 82. As will be seen in Figure 5, this annular trough is formed into a distributor by means of the six pockets 84, each of which connects with a gasoline tube 85. As the cylinders rotate the distributor 82 is carried thereby, thus effecting a uniform division of liquid fuel between the various pockets 84.

The fuel is free to flow from any one of the pockets through the associated tube 85 and, as will be seen in Figure 6, through the passages 86 and 87 to the valve 89. This valve is loosely mounted in the rocker 90 which is pivoted at 91 and provided with a head 92. The spring 93 acting on the rocker 90 holds the valve 89 closed until the projection 85 on rocker 67 engages the head 92 and lifts the valve 89 from its seat. This occurs after the inlet valve 72 has started to open and the valve 89 is reclosed ahead of the closing of valve 72.

A certain constant volume of liquid will be trapped in the passages 86 and 87 at the closing of the valve 89. During the next one and one-half revolutions of this particular cylinder relative to the crankshaft gasoline will accumulate in its tube 85 to be delivered at the next opening of the valve 89. The amount of gasoline delivered at each intake is not a function of the valve opening nor of the size of the passage, but is one sixth of the gasoline that has been pumped through the nozzle 81 during two revolutions of the engine, speaking of revolutions as relative revolutions of the cylinders with respect to the crank shaft.

The weight of the engine is carried by the rear extension 129 of the crankshaft, mounted on bearing 130, and by the front bearing 134 which carries both a radial and a thrust load. The inside bearing 132 carries only the thrust of the forward propeller mounted on the crankshaft and the radial load at this end of the crankshaft.

The forward bearing 134 is carried by the support 136 seen in Figures 3 and 10. This support forms a wall or spider and is provided with a number of openings, particularly the openings 137 which serve to pass air to the scoop 76. These and other openings allow the passage of air to the outer walls of the cylinders for cooling the same. The crank shaft 14 includes the extension 138 on which the forward propeller is mounted. The rear propeller is mounted on the front hub extension 142 which is welded or otherwise attached to the front hub 140 of the crank case 8.

The simple form of ignition system, which is recommended for only certain special applications of this engine, is seen in Figure 3. The battery 101 is directly connected to the two primary leads of the spark coil 102, which is of the type employing a vibrator and having each end of its secondary coil brought out to a separate terminal. From one of these terminals the secondary wire 103 leads to a stationary terminal 104 which contacts with or is a small gap from the ring 110. The other secondary terminal of the coil 102 is connected by means of the wire 105 to the terminal 106 which is associated with the other contact ring 111.

These two rings 110 and 111 are mounted on the insulating ring or sleeve 108. The contact ring 110 has electrical connection 114 to the distributor point 116 while the ring 111 is connected by means of the wire 115 to the distributor point 117. These distributor points are carried by the insulating ring 108 which is mounted on the crank shaft.

Another insulating ring 120 is mounted on the crank case and revolves with the cylinders. In the insulating ring 120 there are three distributor segments 118 and three distributor segments 119. The segments 118 are connected to the spark plugs of the three forward cylinders by three wires 122. These wires are either insulated or mounted out of contact with all metal other than their terminals. In the same manner the three segments 119 are connected one to each of the three spark plugs in the rear cylinders by means of secondary wires 123. The location of spark plug 125 is shown in Figures 2 and 3.

The vibrating spark coil 102 will be in continuous operation with its two secondary terminals connected with the distributing points 116 and 117. At any given instant the secondary current will be passing from one of these distributors to one of the segments 118, over one of the wires 122 to one of the plugs 125, from that cylinder to the cylinder located diametrically opposite and from the plug of this cylinder it will return over its wire 123 to its segment 119. This means that a spark will be occurring in the firing cylinder and in the cylinder which is approaching the end of its exhaust stroke.

This simplified ignition system employs no timer, the timing being accomplished by means of the distributor which requires no auxiliary drive. It is shown here to assist in explaining the ignition systems that are described hereinafter and is not recommended except for a flight of the type disclosed in my co-pending patent application No. 373,050 filed January 3, 1941. For continuous use it is recommended that one of the ignition systems shown by Figures 7, 8 and 9 be employed.

Figure 7 illustrates the use of a timer in connection with the wiring diagram of Figure 3. The battery 101, the coil 102 and the secondary lead 103 and 105 are connected as seen in Figure 3 but the battery circuit is arranged to be interrupted. This interruption may or may not eliminate the use of the vibrator on the coil 102. The brushes 148 are in contact with rings 149 which are mounted in the insulating ring 150.

The battery circuit is connected through these parts to the circuit breaker 152, which is operated by the rocker shaft 153. On this shaft is a cam follower 154 which is actuated by the cam 155. This 12-pointed cam is mounted upon the sleeve 40 between the cam 43 and the crank case end 32. The result is that the timer 152 is actuated three times at each revolution of the engine. The spark occurs in both the firing cylinder and in the exhaust cylinder diametrically opposite it.

Figure 8 illustrates an accessory drive which may be employed to drive a magneto, to replace the battery ignition system seen in Figure 7 or to combine therewith in a dual ignition system.

The bevel gear 158 is mounted on the crank case and the bevel gear 159 is mounted on the crank shaft. These two bevel gears rotate in opposite directions, the one on the crank shaft driving the bevel gear 161 which has its bearing in the fixed support 162. The gear 161 also meshes with one side of the double bevel gear 164 which is free to rotate on the shaft 14. The bevel gear 166 is mounted upon the shaft 167 which is free to rotate in the support 169. This support is in turn free to rotate upon the hub of part 32 and is provided with the counterweight 170.

Assuming that the crank case were held still and shaft 14 allowed to revolve it will be seen that the double gear 164 would be driven in the opposite direction from the crank shaft and at the same speed, since the gears 159 and 164 have the same number of teeth. This rotation of the double gear 164 causes the gear 166 to roll between gears 164 and 158, thus causing rotation of the part 169 upon the hub of the stationary crank case end 32 at one half of crank shaft speed in the opposite direction from that of the crank shaft.

If, however, we hold the crank shaft still and allow the crank case 32 to revolve, it will be seen that the part 169 is caused to revolve in the same direction as the crank case, but at one half of its speed. Any combination of crank shaft and cylinder rotation in opposite directions will cause the part 169 to revolve in the same direction as the crank case at a speed equal to half the sum of the speeds of the crank shaft and the crank case. In other words the gear 172 mounted upon part 169 runs at one half of the relative speed, or a revolution for each cycle of the engine. This provides a means for driving the gear 173 on the accessory shaft 175 at a constant speed relative to the resultant speed of the engine. Assuming the gear 172 to have three times the number of teeth of the spur gear 173, it will be running at 1½ times the relative speed between the crank shaft and the crank case.

This would be the proper speed at which to drive a magneto producing two sparks per rotation; six sparks for each two relative revolutions of the engine.

A magneto type of ignition system may be built into the engine instead of being driven by an accessory shaft. Figure 9 is a somewhat diagrammatic view showing how this can be done. The magneto housing 180 is mounted on the crank case cover 32 and is itself provided with a cover 181 which has a bearing on the extension 129 of the crank shaft 14. Carried by the rotating magneto housing are three magneto coils 182 for the front bank of cylinders and three magneto coils 183 for the rear bank of cylinders. Each of these coils has a secondary lead 185 connected with the spark plug of one of the cylinders. Carried by the crank shaft is the magneto magnet 186 arranged to generate current when its pole 187 passes the pole of one of the coils 182. Likewise there is a magneto magnet 189 and its pole 190 associated with the poles of the three magneto coils 183. The primary circuit of each coil 182 is connected to a breaker 192 and the primary of each of the coils 183 is arranged to be broken by a breaker 193. Mounted on the extension 129 of shaft 14 is the cam 196 and the cam 197 each having one hump 198. The cam 196 engages the roller 199 of lever 200 on the rocker shaft 201 of each of the circuit breakers 192 while the cam 197 actuates similar parts of the breakers 193. This results in a break of the primary circuit and production of a secondary current six times for each relative rotation of the engine. Again we have a spark for each firing cylinder and a spark at the end of each exhaust stroke, the latter doing no harm and allowing us to use this type of magneto which requires no gear drive. The secondary current may in this case return through the primary winding, as it is not necessary that the secondary current pass through two spark plugs in series. Wires 204 and 205 are primary connections between the coils and the breakers.

Figure 10 shows part of the forward end of the engine and the two propellers. This view may be considered as an extension of Figure 3 on a slightly reduced scale. On the sleeve 142 of the engine there is a spacer 212 and then the propeller hub assembly 211, which is secured by the nut 213. The hub assembly is splined to the sleeve 142 and a similar propeller hub assembly 213 is splined to shaft 138 and secured there by the nut 216. The rear propeller hub assembly comprises a pair of similar halves 218 and the forward propeller hub comprises the two halves 219. The parts 218 and 219 may be identical except for their bores to fit the parts 138 and 142 if the two propellers have the same number of blades, but some weight will be saved by making the forward assembly slightly smaller.

The hub assembly 211 is fitted with right hand propeller blades 220 and the assembly 215 with left hand propeller blades 221. Each of these propeller blades is a close but free fit in its hub and is formed with a flange 223 at its inner end to hold it in place against centrifugal force. The blades 220 are fitted with torque arms 224. The left hand blades 221 are fitted with similar but reversely formed torque arms 225. Each of these torque arms might be described as a fork since it comprises a collar surrounding the inner end of the blade and two extensions which straddle the shaft.

The propeller blades are free to rotate along with these torque arms or forks through a considerable angle until stopped by engagement of the arms with each other, with the housing or with the shaft which they straddle. Adjacent arms 224 of adjacent blades have interposed between them a spring 228. It will be seen that the springs 228, of which only one can be seen in Figure 10, will act upon the propeller blades 220 to turn them in opposite directions as indicated by the arrows. In other words the springs 228 are urging the blades 220 in the same direction as each blade is viewed at its tip. Each blade is urged in the direction to increase its right hand pitch. In the same manner the springs 229 act through the torque arms or forks 225 to turn the propeller blades 221 in the direction to give them a left hand pitch of greater lead.

When the engine is started the forward propeller will revolve clockwise, as viewed from in front of the plane, while the rear propeller will revolve counter-clockwise. The blades of either propeller will start from a position of rest in which the springs are expanded and the torque arms are contacting the shaft or other stops as the case may be. As soon as the engine is started there will be a tendency of each blade to reduce its pitch. This effect can be increased or decreased by design of the propeller blade, locating the center of pressure closer to or further from the axis of the bearing of the blade in its hub. If one blade stands at a greater pitch than another of the same propeller its tendency to compress the springs will be greater than that of the other blade and the result will be that the two or more blades of the propeller will come back to the same pitch.

Before the plane has taken off the operation of the engine with the plane standing still will tend to compress the springs to a greater degree than they will be compressed after the plane is in the air. While flying at a low altitude in dense air the load on the propeller blades will tend to compress the springs to a greater degree than they will be compressed after the plane has reached an altitude where the air is less dense. The blades of one propeller will always find a torque balance between each other. The rapidity with which this balance is reached may be increased by the use of ball-bearings in the mounting of the propeller blades in their hub, but it has been found that plain bearings will "float" and balance their torque reactions if in reasonably good condition and subject to the minimum of vibration which is always present. Plain bearings have the advantages of greater rigidity, lower cost, lower weight and of a slight damping of the rate of response to changing conditions.

The spinner 79 is supported from the propeller hub 211 to revolve therewith by means of brackets 207. Likewise the forward spinner 80 is mounted upon the hub assembly 215 by means of brackets 268. These spinners are provided with holes or slots to clear the propeller blades since they depend entirely upon the propeller hubs for their support. For convenience in assembly and for servicing the forward spinner 80 is preferably slotted to receive the blades 221 and the spinner is attached by means of screws which are externally accessible. The gap between the spinners 79 and 80 is shown for convenience at the rear of the forward propeller hub, but this gap may be located closer to the blades 221, or the spinner 80 may be split in a plane with the center line of the blades 221 so that the blades 221 will pass through holes made by semi-circular notching of the two halves of the spinner.

There may be two or more blades in each of the propellers, using a torque arm 224 or 225 on each of the blades and using a number of springs equal to the number of blades. Assuming that the forward propeller has two blades 221 and that the rear propeller has three blades 220, it will be seen that the forward propeller will reach a higher R. P. M. than the rear propeller since their torque reactions must be equal. There is some advantage in this combination of propellers with different numbers of blades in the matter of reducing the interference between blades as they pass each other and the vibrations resulting from this interference. If both propellers have two blades there will be two pairs of blades in interference at the same instant. Likewise, if each of the propellers has three blades equally spaced there will be three pairs of blades in interference with each other at the same instant. By employing different numbers of blades in the two propellers and having these numbers prime to each other the interference is reduced to that of a single pair of blades passing each other at one time. Thus with two blades on the forward propeller and three blades on the rear propeller there will be a single pair of blades passing each other six times in one relative rotation of the propellers. If each propeller had three blades there would be three pairs of blades in interference at one time and this interference would occur three times in each relative rotation of the propellers. It is obvious that the larger number of lesser interferences will put less strain on the propellers and distribute the stresses of interference more uniformly throughout the rotation.

Figure 11 is a section taken on the line 11—11 of Figure 10, showing a vertical section of the rear propeller as viewed from the front with the front half 218 of the propeller hub housing removed. It will be observed that the sectional view of the rear propeller seen in Figure 10 would be the same for any number of blades. The shape of the part 224 will vary in accordance with the number of blades in the propeller, but this change of shape will not be apparent in the section shown in Figure 10. The halves 218 which form the housing of the propeller hub may completely enclose the torque arms and springs as shown by assembly 211 in Figures 10 and 11, or this housing may be open for easy access to the springs and any adjustments thereof, as shown by the assembly 215 in Figure 10.

In both Figures 10 and 11 the small arrows appearing on the propeller blades indicate the direction in which the springs are urging the blades, i. e., the tendency to increase the pitch of the blade. On an end view such as Figure 11 these arrows will all point either clockwise or counter-clockwise. In a plan view such as Figure 10 these arrows appear to point in opposite directions, but it will be seen that all blades will bear the same marking when moved to the same position.

The rate of propeller pitch change may be varied by design or adjustment. One method of varying this rate by design is to vary the position of the axis of propeller blade adjustment relative to the axis of the center of pressure on the blade. The greater the distance that the center of pressure falls back of the axis of blade adjustment the greater will be the effect of air density in turning the blade to a lesser pitch. This effect is further subject to design modifications in the form of the blade because of the effect of blade form upon the rate of shift of the center of pressure due to changes of the angle of incidence.

A considerable flexibility of design is available through changes of spring rate. A spring of low rate having a free length considerably greater than its maximum confined length will be more sensitive to changes in air density. On the other hand a spring having a high rate and a free length little if any longer than its maximum confined length will offer a greater resistance to blade adjustment in the direction of a lesser pitch and consequently will produce a greater tendency to turn the blade in the direction of a greater pitch as air of lesser density is encountered.

These effects are further subject to design modifications by the use of different forms of torque arms, angles, leverages, cams, toggles, etc. Another method of modifying the spring action is to employ two springs as illustrated in Figure 12. With this arrangement the spring 228 acts as before described and is subject to the previously mentioned design variations. A further modification of spring action is obtained by means of the inner spring 230, which comes into action after the spring 228 has been compressed by the turning of the propeller blades to a certain preselected pitch.

Figure 12 also illustrates adjustment means for modifying the degree of compression of each spring independently. This provides for changing the rate of automatic propeller pitch modification in either the low or the high pitch range.

It will be seen that in an automatically adjustable propeller of this type, any given blade that is carrying more than its share of the load because of being set at too great a pitch will be turned in the direction of a lesser pitch by air resistance and its movement in this direction will have an effect of increasing the spring-applied torque on the other blades in the direction of turning them to a greater pitch. In other words there is a constant effect in the direction of causing all blades to come to the same pitch and to make each one carry its true percentage of the load. While the blades for this type of propeller should be uniform in form, weight and moment of inertia about the shaft axis, this new type of adjustable pitch propeller hub will compensate to a considerable degree for inaccuracies in blades and in their mounting.

In Figure 12 I have illustrated methods of spring adjustment for the purpose of independently modifying the spring effect in either the high pitch or the low pitch range. We see portions of two torque arms 224, between which the spring 228 is compressed as in Figure 10, but the arms 224 are tapped for adjustment screws and their bosses 226 eliminated. In one of the arms 224 we see the adjustment screw 231, which has no effect on the spring 228 but varies the point at which spring 230 becomes effective. As shown, the spring 230 has not yet contacted its stop 231. The screw 231 is provided with a lock nut 232 and is internally threaded to receive the stop screw 237, which acts in conjunction with the loose stop rod 236 to limit the compression of the springs and thereby set a minimum lead for the propeller.

The other of the arms 224 is provided with an adjustable spring retainer 233 in place of the fixed boss 226. This spring retainer is adjusted by means of screw 234 which is in turn secured by lock nut 235. An adjustment of the screw 234 affects the initial loading of spring 228. The initial loading of spring 230 remains at zero, but it will come into action sooner or later. It will be seen that any change in the adjustment of screw 234 with regard to the spring 230 may be exactly offset or even reversed by an adjustment of the screw 231.

After the springs have been adjusted to accomplish the desired rate of automatic propeller adjustment the screw 237 may be set to limit this propeller adjustment to a minimum pitch. The arms 224 will strike the shaft or sleeve on which the propeller hub is mounted and thus establish the maximum limit of propeller pitch. Screws 239 (Figure 11) or other adjustable stop means may be provided for the arms 224, one such adjustable stop for each propeller blade, if it is desired to make this limit adjustable. The torque arms 224 and 225 may be made adjustable on the blades 220 and 221 by providing a plurality of key-ways for key 222 seen in Figure 10, or by using a fine pitch spline at this point.

The springs 228, 229 and 230 may be replaced by similar springs having different free lengths or different spring rates or both. It will be seen that with the multiple springs and adjustments I have provided there are an infinite number of combinations of adjustments of the rate of propeller pitch change in both its lower pitch range and its higher pitch range. For certain classes of operation it may be desirable to let the propeller pitch be established by the stops at one limit, particularly if a large percentage of the flying is to be done in atmosphere of a constant density. On the other hand a plane that is to be flown at a wide variety of altitudes may have the stops set far enough apart so that all of the operation falls within the range of automatic propeller pitch regulation.

Attention is called to the fact that this method of effecting pitch regulation in response to changes in air resistance has certain advantages over other methods of regulating the pitch of propellers either manually or automatically. While mechanical connections are commonly used to provide for remote control of the pitch of a propeller by manual or automatic means, such connections become quite complicated when two propellers are mounted adjacent to each other upon the same axis and driven in opposite directions. Further complications arise to make such connections impractical when the propellers are direct-connected to the oppositely rotating crank shaft and crank case of a birotary engine. The combination of variable-pitch propellers with a bi-rotary engine has therefore been slow in development, but the problem is nicely solved by the methods herein disclosed.

In addition to solving the problem of variable pitch propeller regulation on the birotary type of engine, my new method of propeller pitch regulation has certain advantages when the propellers are used on other engines, either in tandem or separately.

One of these advantages is in the absence of centrifugal weights such as have been proposed for use in varying the pitch of a propeller in response to speed changes. Such weights affect balance adversely and require the engine speed to vary in order to effect the changes of pitch.

It should be noted that if the springs were arranged to act separately on each blade of the propeller they would not accomplish the object of balancing propeller blade pitches against each other as is here done by making the springs act between two propeller blades so that a blade having a greater pitch will act through the spring to increase the pitch of the adjacent blade or blades, thus bringing all blades to a uniform pitch.

The gasoline pump used to supply fuel to the nozzle 81 is not shown, but may be of any suitable type, preferably gear driven from the shaft 175 of Figure 8 or from either of the two revolving elements. This pump will be of a variable flow type or equipped with a by-pass or throttling valve for the purpose of providing engine control by varying the rate of fuel feed to the nozzle 81. This or some other arrangement is to be used to insure stoppage of fuel flow when the engine is idle.

The method of assembling the engine will normally be to assemble the crank shaft, the cams and cam gears to the crank case with the rings 23 loose upon the shaft. The connecting rods are then assembled through the openings for the cylinders, the pistons are then attached to their rods by means of the piston pins, the rings placed on the pistons and finally the cylinders slipped into place over the pistons.

The forward inclination of the scoop 76 is shown in Figure 2 as 5 degrees. This is calculated for a given speed of cylinder rotation and for a very high given air speed of the plane. At a lower air speed or a higher cylinder R. P. M. the angle of the scoop would be increased to make it face in the direction of air approach so as to obtain the maximum supercharging effect.

An additional control of the engine may be provided for use at low altitudes where the supercharging effect would normally be too great and for operation at reduced speed and power. This can be a throttle arranged to partially close the openings 137 (Fig. 10) or the inlet valve opening may be varied to take in less air. One means which I propose to use for varying the inlet opening and thereby the compression is to provide an auxiliary cam on the order of the cam F' seen in Figures 1, 2 and 3 of F. O. Farwell's U. S. Patent No. 806,125. This auxiliary cam may be employed to shorten the period of inlet valve opening for the purpose of producing a throttling effect, though Farwell shows it as used to increase the period of inlet valve opening so that a part of the mixture of air and gasoline is blown back out of the cylinder before the inlet valve is closed to reduce the charge and the power output.

When cylinders are arranged in four or more planes, using a crankshaft of four or more throws there may be a set of gears and a cam or cams at each end of the crank case. This will call for a second support similar to 27 opposite the forward throw of the crank shaft, replacing the counterweight shown in Figures 3 and 10, but this support need not be removable as is 27.

The cylinders are shown without fins or other cooling devices, as it has been found possible to obtain satisfactory air cooling of this type of engine without such devices, but it is understood that fins or other cooling means may be added to the cylinders if desired.

The lever 65 may be omitted and the rod 62 connected directly to an elongation of one or both rockers 67, and other details may be modified as suggested by common engineering practice.

What I claim as new and desire to secure by Letters Patent of the United States is:

1. In an aircraft, the combination of a pair of coaxial propellers each including a hub and a plurality of blades, each blade of one of said propellers being movable with respect to its hub to vary its pitch, spring means interposed between a pair of said blades for urging them toward angles of increased pitch so that a decrease of pitch of one blade acts through said spring means to increase the spring effect urging another blade to a greater pitch for the purpose of balancing the loads on individual blades of said one propeller, said spring means including means acting to vary its spring rate when said blades reach a given pitch, and driving means for said propellers including a pair of coaxial shafts, one for each of said propellers, said driving means acting in response to variations in the torque on the said shaft driving said variable pitch propeller caused by a change of pitch of the said variable pitch propeller driven thereby to apply a corresponding change of torque to the other of said shafts.

2. In an aircraft, the combination of a pair of coaxial propellers each including a hub and a plurality of blades, one of said propellers having at least three blades, each blade of each of said propellers being movable with respect to its hub to vary its pitch, spring means interposed between pairs of said blades for urging each blade of the pair toward an angle of increased pitch so that a decrease of pitch of one blade acts through said spring means to increase the spring effect urging the other blade of the pair to a greater pitch for the purpose of balancing the loads on individual blades of a given propeller, adjustable stop means for limiting the change of pitch of said blades, and driving means for said propellers extending axially in one direction from said propellers, said driving means including a pair of coaxial shafts, one for each of said propellers, said driving means acting in response to variations in the torque on one of said shafts caused by a change of pitch of the propeller driven thereby to apply a corresponding change of torque to the other of said shafts.

3. In an aircraft, the combination of a pair of coaxial propellers each including a hub and a plurality of blades, each blade of each of said propellers being movable with respect to its hub to vary its pitch, spring means interposed between pairs of said blades for urging each blade of each pair toward an angle of increased pitch so that a decrease of pitch of one blade acts through said spring means to increase the spring effect urging the other blade of the pair to a greater pitch for the purpose of balancing the loads on individual blades of each of said propellers, said spring means including means for modifying its effect, and driving means for said propellers including a pair of coaxial shafts, one for each of said propellers, said driving means acting in response to variations in the torque on one of said shafts caused by a change of pitch of the propeller driven thereby to apply a corresponding change of torque to the other of said shafts and maintain a constant relationship between the driving torques applied to said propellers.

4. In an aircraft, the combination of a pair of coaxial propellers each including a hub and a plurality of blades, each blade of one of said propellers being movable with respect to its hub to vary its pitch, spring means interposed between a pair of said blades for urging them against air resistance toward angles of increased pitch so that a decrease of pitch of one blade acts through said spring means to increase the spring effect urging another blade to a greater pitch for the purpose of balancing the loads on individual blades of said one propeller, and driving means for said propellers including a pair of coaxial shafts, one for each of said propellers, said driving means acting in response to variations in the torque on the said shaft driving said variable pitch propeller caused by a change of pitch of the said variable pitch propeller driven thereby to apply a corresponding change of torque to the other of said shafts and thereby vary the speed relationship between said propellers to maintain a constant relationship between their torque reactions.

5. In an aircraft, the combination of a pair of coaxial propellers each including a hub and a plurality of blades, each blade of one of said propellers being movable with respect to its hub to vary its pitch, spring means interposed between a pair of said blades for urging them toward angles of increased pitch so that a decrease of pitch of one blade acts through said spring means to increase the spring effect urging another blade to a greater pitch for the purpose of balancing the loads on individual blades of said one propeller, and driving means for said propellers including a pair of coaxial shafts, one for each of said propellers, said driving means being directly connected to each of said shafts and acting in response to variations in the torque on the said shaft driving said variable pitch propeller caused by a change of pitch of the said variable pitch propeller driven thereby to apply a corresponding change of torque to the other of said shafts.

GLENN MUFFLY.

REFERENCES CITED

The following references are of record in the file of this patent:

UNITED STATES PATENTS

| Number | Name | Date |
|---|---|---|
| 2,236,841 | Waseige | Apr. 1, 1941 |
| 1,970,847 | Gibbs | Aug. 21, 1934 |
| 2,234,187 | Meyer | Mar. 11, 1941 |
| 1,418,209 | Smith | May 30, 1922 |
| 507,989 | Brunler | Nov. 7, 1893 |
| 1,170,783 | Stedman | Feb. 8, 1916 |
| 1,866,281 | Woolson | July 5, 1932 |
| 2,160,444 | Schubert | May 30, 1939 |
| 2,154,359 | Sarazin | Apr. 11, 1939 |
| 1,151,568 | Conill | Aug. 31, 1915 |
| 2,216,013 | Kenney | Sept. 24, 1940 |
| 1,952,066 | Havill | Mar. 27, 1934 |
| 2,123,057 | Martin | July 5, 1938 |
| 2,043,704 | McPherren | June 9, 1936 |
| 1,132,368 | Lorenc et al. | Mar. 16, 1915 |
| 1,242,788 | Francisco | Oct. 9, 1917 |
| 1,250,263 | Yates | Dec. 18, 1917 |
| 1,841,497 | Parham | Jan. 19, 1932 |
| 1,876,634 | Desautels | Sept. 13, 1932 |
| 1,879,935 | Hill | Sept. 27, 1932 |
| 1,931,710 | Smith et al. | Oct. 24, 1933 |
| 1,934,668 | Havill | Nov. 7, 1933 |
| 1,952,798 | Havill | Mar. 27, 1934 |
| 2,030,953 | Gemeny | Feb. 18, 1936 |
| 2,232,683 | Lloyd | Feb. 25, 1941 |
| 2,233,364 | Gemeny | Feb. 25, 1941 |
| 2,236,201 | Rupp | Mar. 25, 1941 |
| 2,241,055 | Chilton | May 6, 1941 |
| 2,276,663 | Mercier | Mar. 17, 1942 |
| 2,282,077 | Moore | May 5, 1942 |
| 2,297,815 | Tidd | Oct. 6, 1942 |
| 2,312,624 | Caldwell | Mar. 2, 1943 |

FOREIGN PATENTS

| Number | Country | Date |
|---|---|---|
| 432,899 | French | Oct. 16, 1911 |
| 397,499 | French | Feb. 26, 1909 |
| 620,969 | French | Jan. 25, 1927 |
| 521,868 | British | June 3, 1940 |
| 614,716 | French | Sept. 24, 1926 |
| 814,570 | French | Mar. 22, 1937 |
| 324,755 | Italian | Feb. 14, 1935 |